Dec. 24, 1957     H. K. DOMMEL ET AL     2,817,317
ELECTRICALLY CONTROLLED FLUID MOTOR
Filed April 29, 1954     8 Sheets-Sheet 3
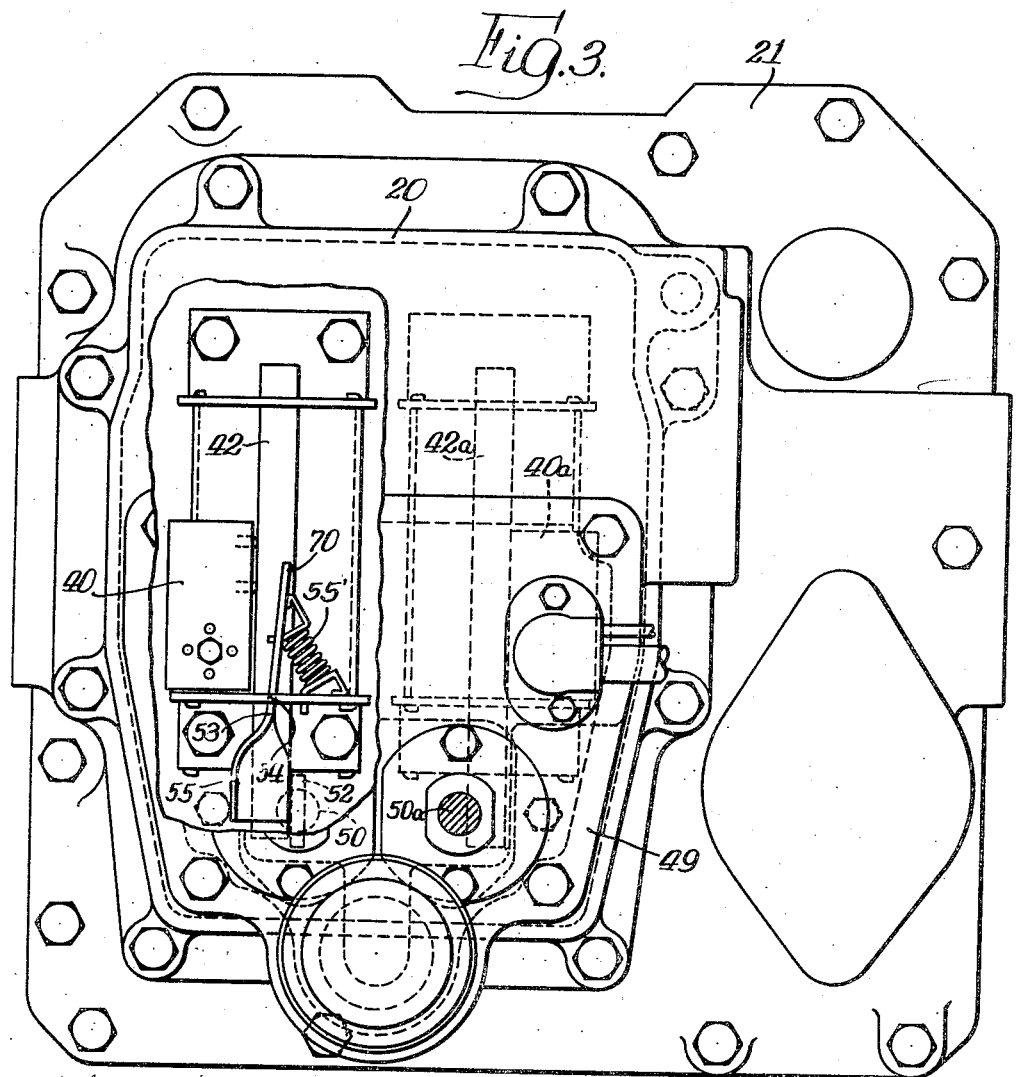
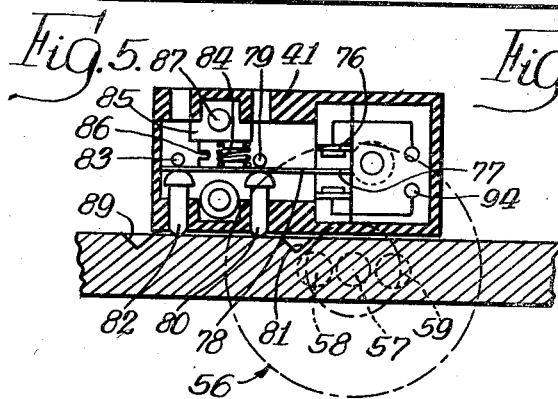
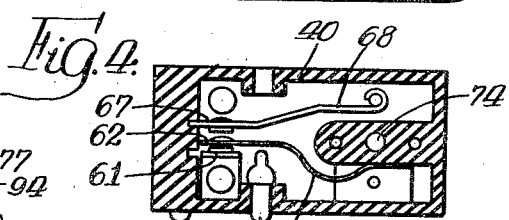
INVENTORS.
*Homer K. Dommel,*
BY *Charles F. Adams,*
*John P. Smith*
Atty.

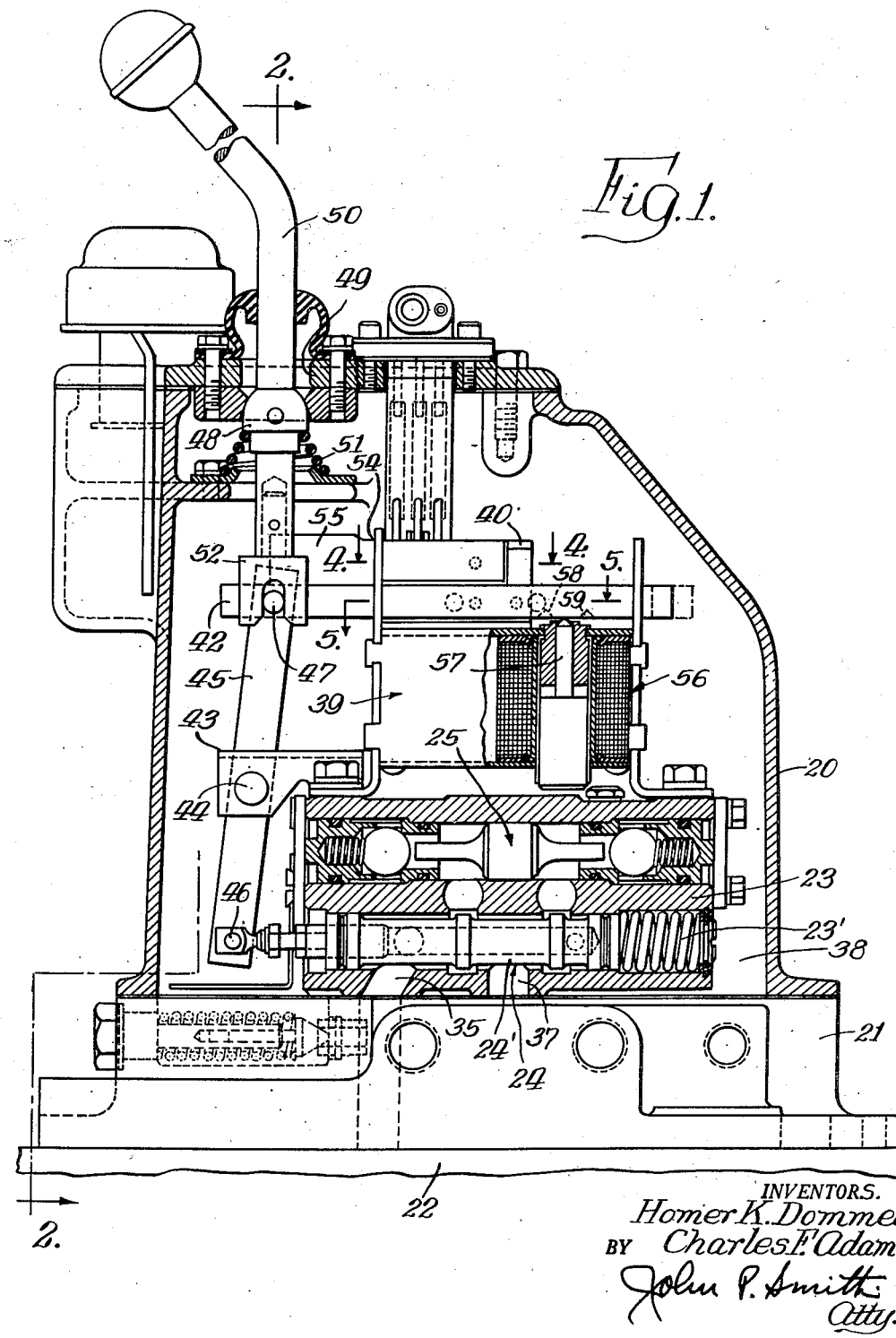

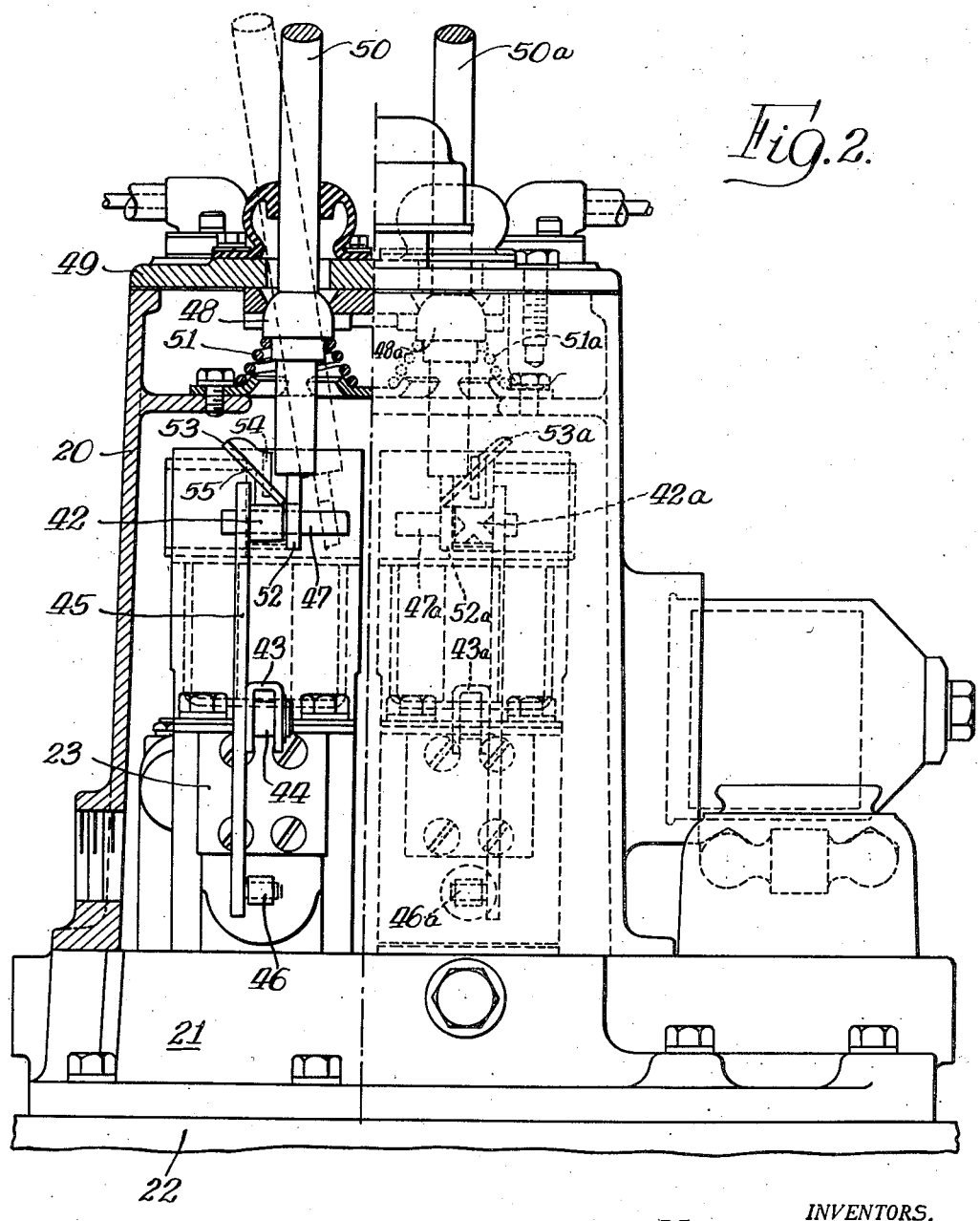

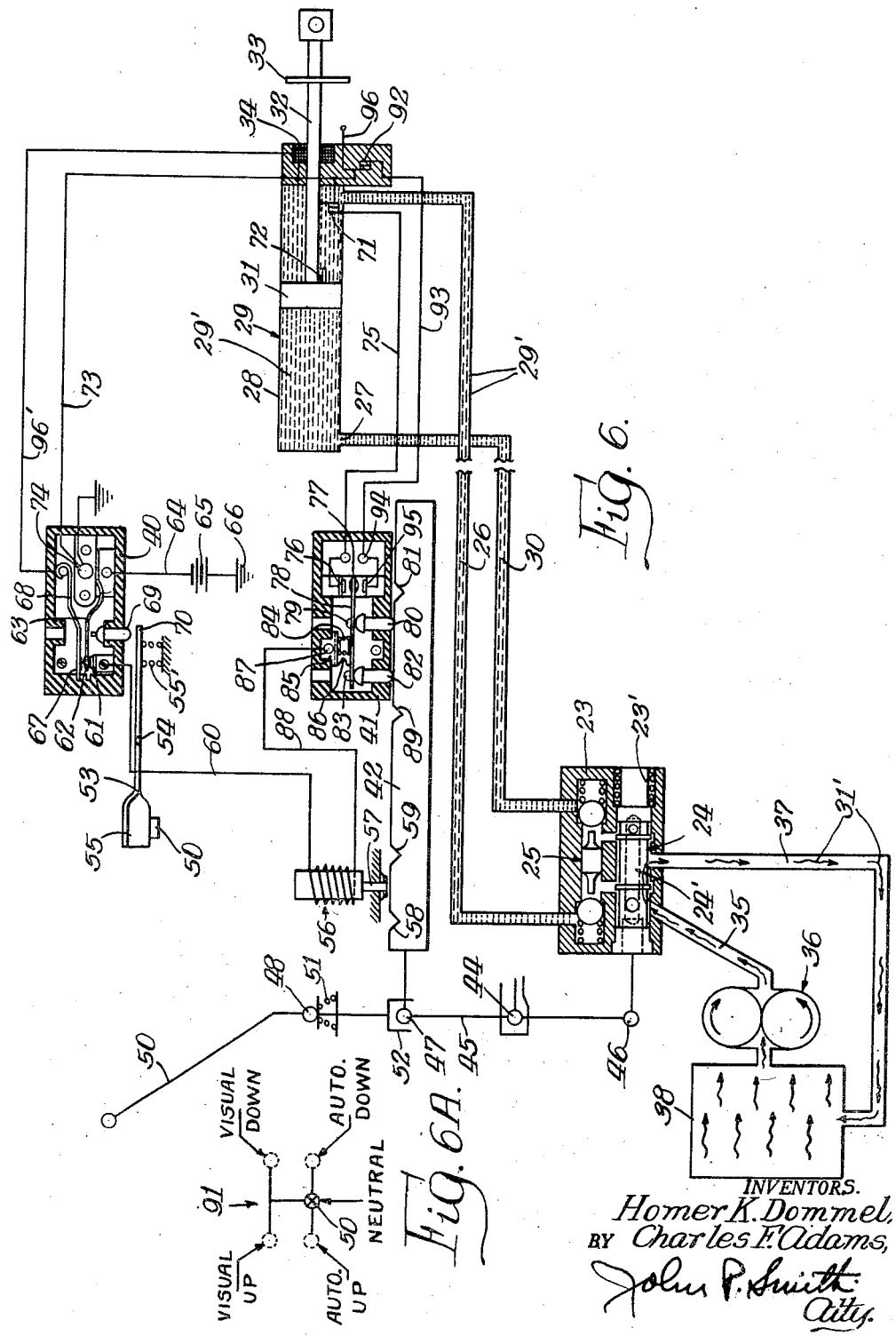

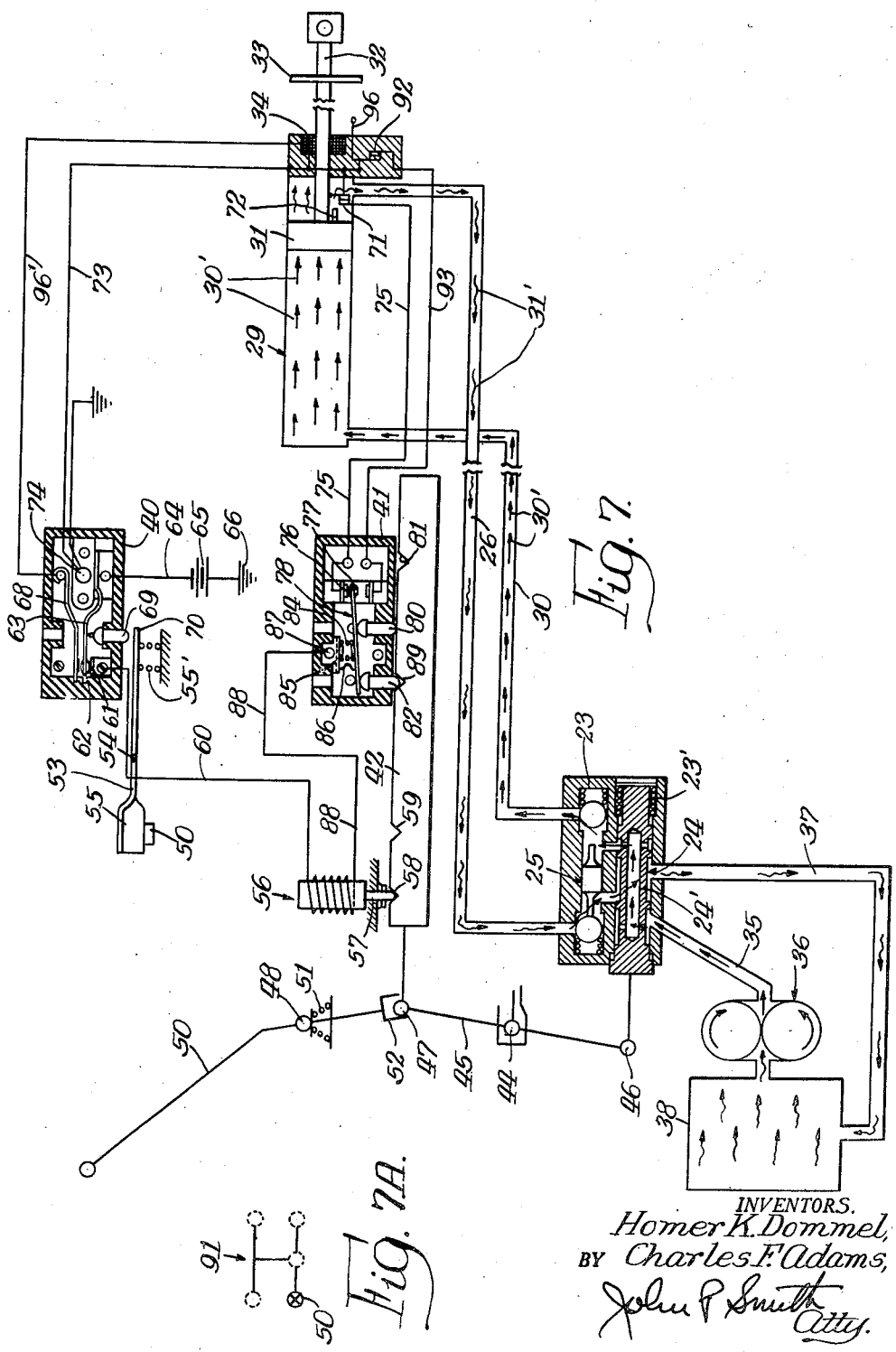

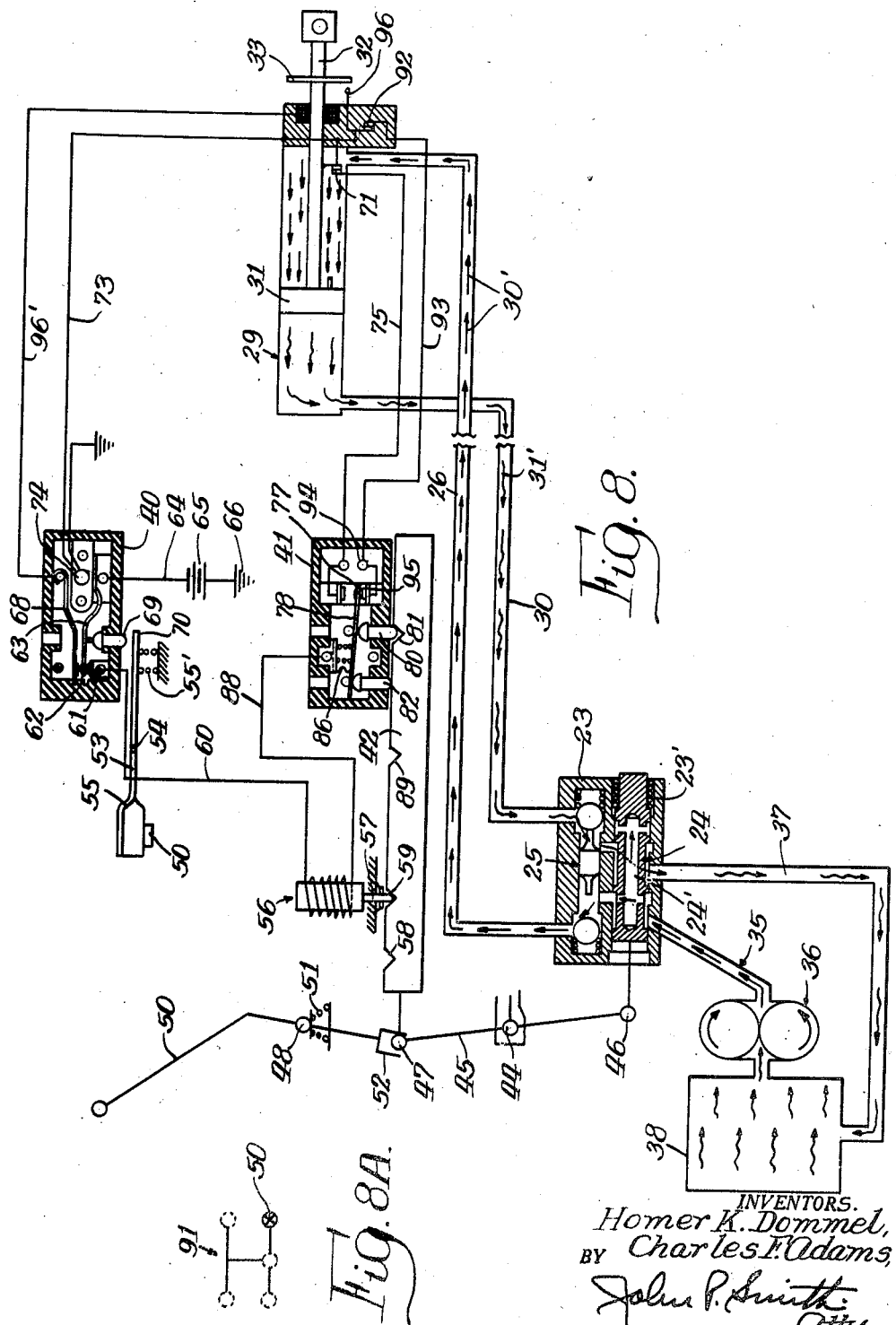

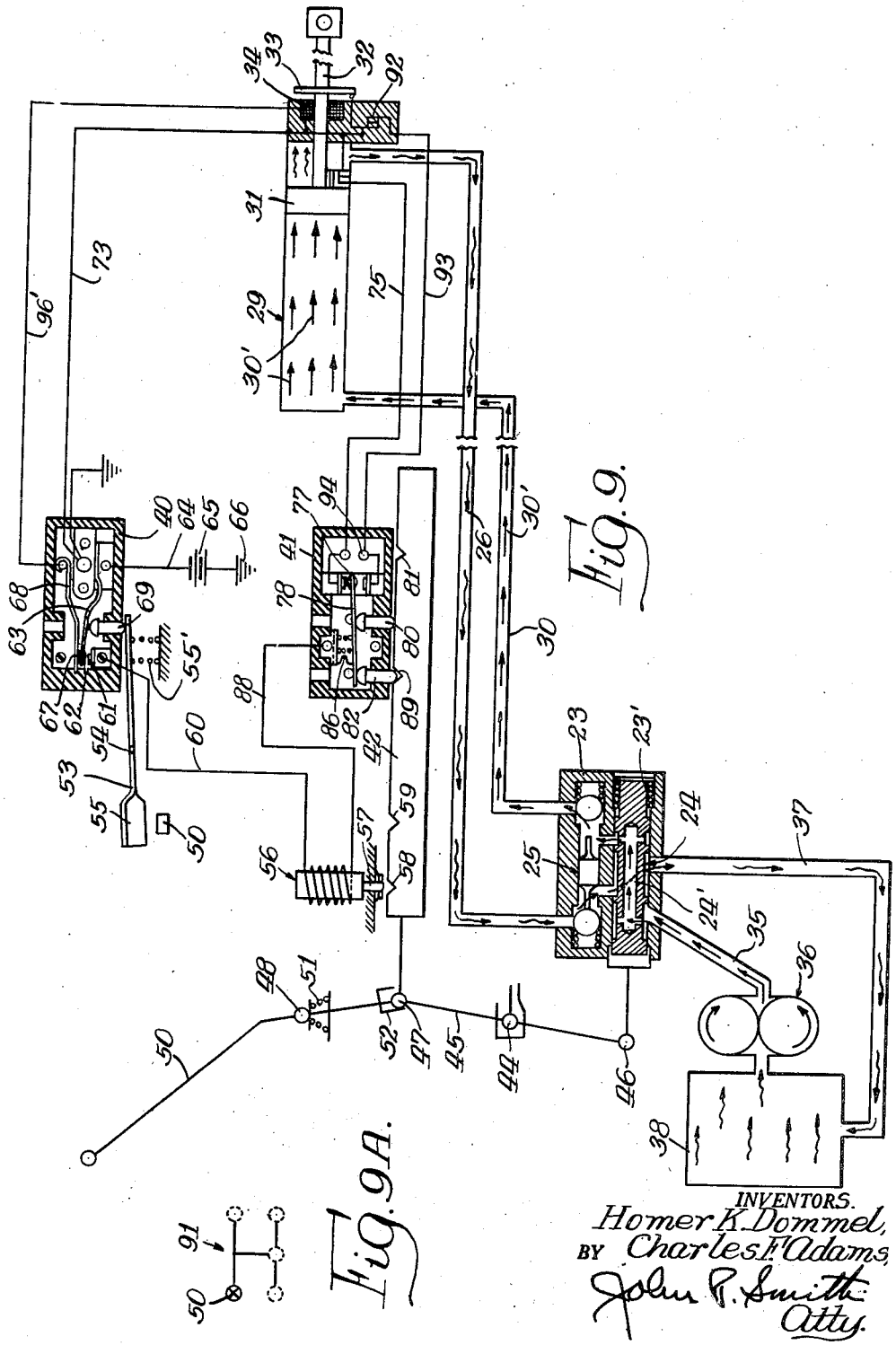

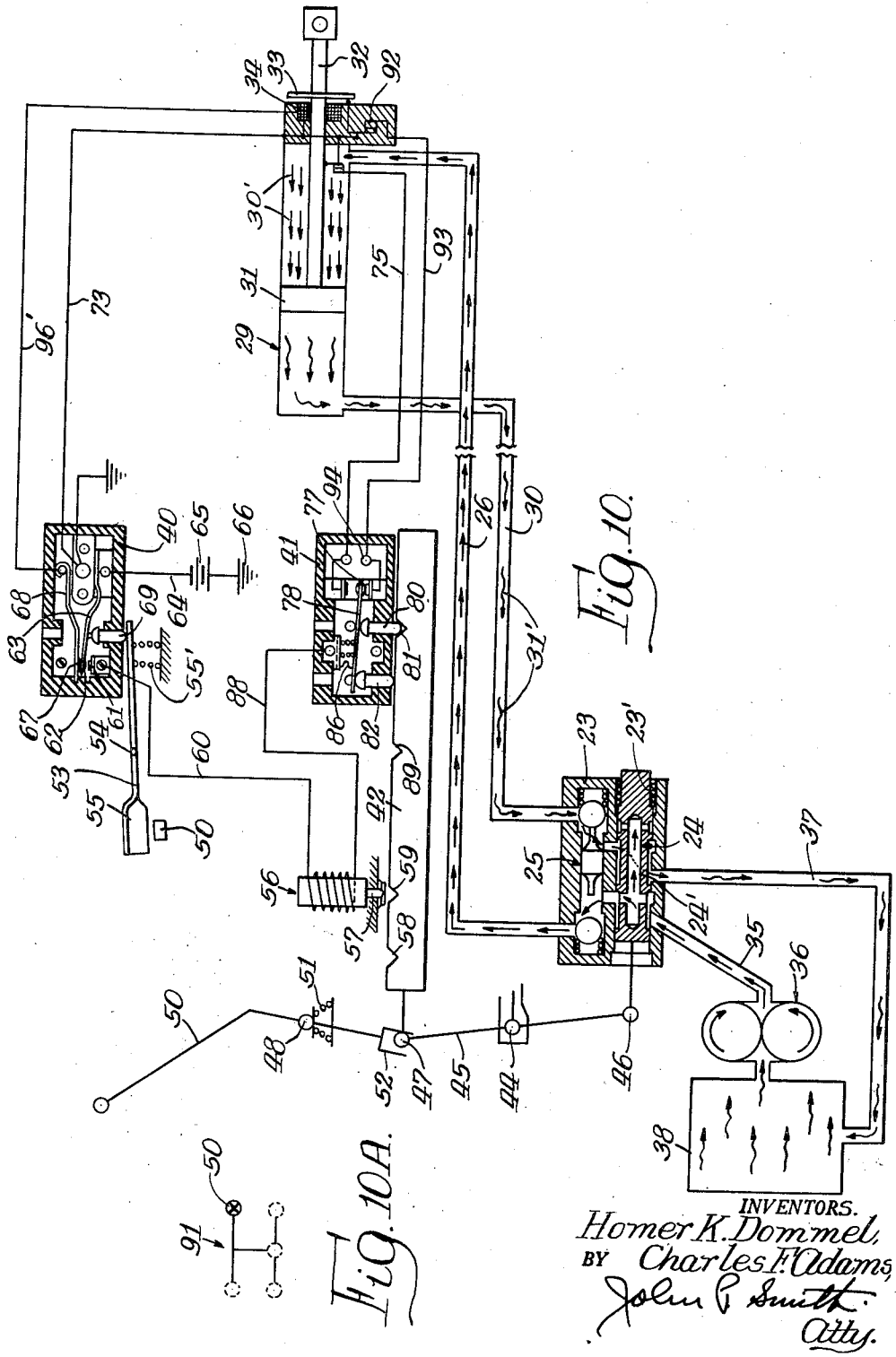

United States Patent Office 2,817,317
Patented Dec. 24, 1957

2,817,317

ELECTRICALLY CONTROLLED FLUID MOTOR

Homer K. Dommel and Charles F. Adams, Charles City, Iowa, assignors to The Oliver Corporation, a corporation of Delaware Application April 29, 1954, Serial No. 426,512

2 Claims. (Cl. 121—38)

The present invention relates generally to an electrically controlled fluid motor, but more particularly to a novel and simplified construction of an electrically controlled hydraulically actuated cylinder unit in which said unit may be remotely controlled so as to secure a wide variety of adjustments or preselection of working ranges of the cylinder unit.

The primary object of the present invention is to provide a novel and improved as well as simplified construction of a manually operative means associated with an electrically energized mechanism for controlling the functional operation of a fluid cylinder motor or unit wherein a manual lever will automatically return to neutral position when released to thereby shift the valve mechanism and automatically actuate or control the electrical elements so that the operator may override or interrupt the normal operating cycle of operation of the fluid motor or cylinder unit.

A further object of the invention is to provide a novel and improved remote control for a fluid motor or hydraulically actuated cylinder unit in which a single manually operable lever may be moved into any one of a plurality of positions for selectively synchronizing the proper functional operation of the valve mechanism and the electrical controls associated therewith.

A still further object of the invention is to provide a novel and improved selective control mechanism for a hydraulic cylinder unit in which manually shiftable means operates the switching mechanism for a plurality of electrical circuits and holds the selector valve in preselected positions.

A further object of the invention is to provide a novel and improved stroke control mechanism for a hydraulically actuated cylinder unit in which a manually operable lever selectively and/or simultaneously controls both electrical and hydraulic circuits.

These and other objects are accomplished by providing a construction and an arrangement of the various parts in a manner hereinafter disclosed and particularly pointed out in the appended claims.

Referring to the drawings:

Fig. 1 is a fragmentary side elevational view, partly in cross-section, showing the operating lever, the valve mechanism and a portion of the solenoid and switch and mechanism;

Fig. 2 is a rear elevational view partly in cross-section taken on the lines 2—2 in Fig. 1;

Fig. 3 is a top plan view of the mechanism shown in Figs. 1 and 2 with certain parts broken away for the purpose of clearness;

Fig. 4 is an enlarged fragmentary cross-sectional view taken on the lines 4—4 in Fig. 1;

Fig. 5 is an enlarged fragmentary cross-sectional view taken on the lines 5—5 in Fig. 1;

Fig. 6 is a diagrammatic view showing the complete operating units with the lever control and its associated electrical circuits in neutral position;

Fig. 6A is a diagrammatic view showing the position of the operating lever in Fig. 6;

Fig. 7 is a diagrammatic view in which the operating lever and associated parts have been shifted to the automatic up position;

Fig. 7A is a diagrammatic view showing the position of the operating lever in Fig. 7;

Fig. 8 is a diagrammatic view in which the operating lever and associated parts have been shifted to its automatic down position;

Fig. 8A is a diagrammatic view showing the position of the operating lever in Fig. 8;

Fig. 9 is a diagrammatic view in which the operating lever and associated parts have been shifted to its visual up position;

Fig. 9A is a diagrammatic view showing the position of the operating lever in Fig. 9;

Fig. 10 is a diagrammatic view in which the operating lever and associated parts have been shifted to its visual down position; and Fig. 10A is a diagrammatic view showing the position of the operating lever in Fig. 10.

The present invention is an improvement on the construction disclosed and claimed in the co-pending application of Charles A. L. Ruhl, Serial No. 134, 213, filed December 21, 1949, on a Fluid Lift Mechanism, issued May 10, 1955, as Patent No. 2,707,867. The distinguishing characteristics of this invention over that disclosed in the above application is that a single manually operated lever controls or actuates the selector valve instead of employing a solenoid for this purpose; and the lever, in turn, controls the electrical switches for the various circuits, thereby eliminating to a considerable extent the number of operating parts heretofore required.

In illustrating one form our invention may assume in practice, we have shown the same as comprising a casing 20 and base casting 21, both of which may be conveniently mounted on the main frame portion 22 of a tractor in a position convenient to the operator of the tractor. Supported by the base casting 21 and within the tractor frame, is a fluid pump operatively driven by the engine of the tractor. The pump is shown in the diagrammatic views of the drawings. Mounted within the housing 20 is a valve casing 23 in which is mounted a selector valve, generally indicated by the reference character 24. The valve 24 comprises a conventional spool or valve member 24' and a valve spool centering spring 23'. Positioned above the valve casing is an interlocking valve, generally indicated by the reference character 25. The two valve mechanisms are connected to and communicate with the pump and the hydraulic cylinder unit in substantially the same manner and function of operation as that disclosed in the aforementioned Ruhl application.

In the diagrammatic views shown in Figs. 6 to 10 of the drawings, a fluid conduit 30 connects one end of the interlock valve 25 with the piston end 27 of the cylinder 28 of a fluid motor or hydraulic cylinder unit, generally indicated by the reference character 29. A second fluid conduit 26 connects the other end of the interlock valve 25 with the piston rod end of the cylinder 28. Reciprocally mounted in the cylinder 28 is a piston 31 which has connected thereto the usual piston rod 32. Adjustably and frictionally mounted on the piston rod 32 is a preselection of depth stop collar 33. Mounted in the rod end of the cylinder 28 is an electro-magnetic element 34 which, when energized, magnetically retains or holds the collar 33, under certain operating conditions, in the function of adjusting said collar on the piston rod on the outward or visual stroke of the piston rod. Fluid under pressure is supplied to one end of the selector valve 24 by a conduit 35 through the medium of a pump, generally indicated by the reference character 36. The fluid is returned from an intermediate portion of the selector valve 24 by a conduit 37 which, in turn, is connected to the fluid reservoir 38. The reservoir 38 in this instance is formed in and by the lower portion of the housing 20.

The construction thus far described is essentially like that disclosed in the aforementioned Ruhl application and for that reason a more detailed description of the operation of these parts has been omitted since per se they are not part of the present invention except as they may contribute to the combination of the novel and improved features of the invention as hereinafter described.

Mounted on the valve housing 23 is a solenoid housing, generally indicated by the reference character 39. Located on the upper portion of the housing 39 is a switch box 40. Located in the lower portion of the switch box 40 is a second switch compartment 41. (See Figs. 4 and 5 of the drawings.) Longitudinally movable in suitable slots in the opposite ends of the solenoid housing 39 is a shifter rail 42. Pivotally mounted on a bracket 43 secured to the rear end of the valve housing 23 by a pivot pin 44 is a lever 45. The lower end of the lever 45 is pivotally connected, as shown at 46, to the selector valve member 24'. The upper end of the lever 45 is slotted to pivotally engage a transverse pin 47 secured to the rearward end of the shifter rail 42. The pin 47 projects laterally from one side of the rail 42 for the purpose hereinafter described.

Pivotally mounted in a ball and socket bearing, generally indicated by the reference character 48, in a cover plate 49 in the housing 20, is a hand operating lever 50. A helical spring 51 is suitably supported in the housing 20 to return the lever to its normal or neutral position in a manner well understood in the art. The lower end of the hand lever 50 has a flattened and forked end portion as shown at 52. This forked end portion 52 is adapted to straddle the pin 47 for actuating the lever 45 and thereby actuates the shifter rail 42 and the selector valve 24'. In this connection it will be noted that the forked member 52 may move laterally with respect to the pin 47 without becoming disengaged therefrom.

Located in the path of lateral movement of the lower end of the hand lever 50 is a switch operating lever 53. This lever 53 extends longitudinally of the switch box 40 and is pivoted adjacent thereto, as shown at 54, in a vertical slot 54' in the rear wall of the solenoid housing 39. (See Figs. 2 and 6 of the drawings.) The rear end of the switch is twisted or inclined, as shown at 55, and lies in the path of movement of the lower end of the hand lever 50 when the latter is actuated laterally to thereby actuate the switch lever 53 about its pivot 54 to control certain electrical circuits hereinafter described. A spring 55' normally urges the switch lever 53 about its pivot 54 in a direction toward and parallel to one side of the switch box 40 for actuating one of the poppet switches in the manner hereinafter described.

Mounted in the forward end of the solenoid housing 39 is a solenoid, generally indicated by the reference character 56, which is provided with a vertically actuated plunger 57. The plunger 57 is adapted to engage one or the other of two spaced apart recesses 58 and 59 in the shifter rail 42 for locking the same in either of these two positions.

Referring to the diagrammatic view in Fig. 6 of the drawings, it will be noted that one terminal of the solenoid coil 56 is connected by a wire 60 to a terminal contact point 61 in the switch housing 40. Adapted to engage the contact point 61 is a contact point 62 which is secured to the free end of a flexible contact arm 63. The fixed end of the arm 63 is connected by a wire 64 to a battery 65. One terminal of the battery is grounded, as shown at 66. Positioned in the path of the contact point 62 is a spaced contact point 67 which is secured to a stationary member 68. The contact point 62 is normally actuated into contacting position with the contact 61 when the operating parts and the operating lever 50 are in neutral position or the position shown in Fig. 6 of the drawings. The arm 63 and its contact point 62 are actuated away from the contact point 61 and into contacting relation with contact point 67 by a reciprocal switch plunger 69 which is suitably mounted in an aperture in one side of the switch box 40. The plunger 69 is located in the path of the forward end of the switch lever 53 which, in turn, is actuated by lateral movement of the hand lever in the manner hereinafter more fully described. Mounted adjacent the piston rod end of the cylinder 28 is an up limit switch 71 which is normally closed and is adapted to be broken by a projection 72 carried by the piston 31. This switch is connected by a ground wire 73 to a ground post 74 in the switch box 40. The other terminal of the up switch 71 is connected by a wire 75 to a contact point 76 located within the switch box 41. Adapted to engage the contact point 76 is a contact point 77 which is mounted on the forward end of an oscillatable arm control 78. The arm 78 is provided with a centrally disposed aperture to freely receive a projection 79 on the inner end of a reciprocally mounted plunger 80. The plunger 80 is adapted to reciprocally project through a suitable aperture in the wall of the switch box 41 and into the path of the shifter rail 42. When the shifter rail 42 is moved to its extreme left position, the outer end of the plunger 80 will be depressed into a notch 81 in the shifter rail 42 to actuate the arm 78 from its intermediate or non-contacting position shown in Fig. 6 of the drawings to a different or other contact position, in the manner hereinafter more fully described.

The rear end of the control arm 78 is supported on and actuated by a second plunger 82 which is reciprocally mounted in a suitable aperture in the side wall of the switch box 41 adjacent the plunger 80. A projection 83 on the inner end of the plunger 82 extends through a slotted aperture in the left hand end of the arm 78 to permit free actuation of the arm. A compression spring 84 positioned between the arm 78 and a terminal bracket 85 normally urges the arm in a direction toward both plungers 80 and 82. A jumper wire 86 connects the arm 78 with a terminal post 87. The post 87 is connected by a wire 88 to the other terminal wire of the solenoid 56. The outer end of the plunger 82 lies in the path of the shifter rail 42 and is adapted to engage a notch 89, as shown in Fig. 7 of the drawings, to thereby close the contact points 76 and 77 and as a result, close the circuit to energize the solenoid 56 and lock the shifter rail 42 in the position shown in Fig. 7 of the drawings. This figure shows the automatic up position of the cylinder unit. When the piston 31 reaches its extreme up position, the projection 72 on the piston 31 breaks the switch contact points 71, thereby breaking the circuit just described to de-energize the solenoid 56. In this connection it will be noted that when the poppet 57 of the solenoid 56 is disengaged from the notch 58 in the rail 42, the hand lever 50 and the valve 24 will automatically return to neutral position as shown in Fig. 6 of the drawings. Thus the valve spool centering spring 23' will actuate the valve member 24' to the position shown in Fig. 6 of the drawings, in which position the fluid is trapped in the cylinder 29 and the pump 36 will by-pass the fluid directly to the reservoir 38. In this connection the trapped fluid is designated by broken straight lines, as indicated at 29'. High pressure fluid is designated by straight line with arrows as indicated at 30' and low pressure is designated by an irregular line and arrow as indicated at 31'.

Figs. 6A to 10A inclusive show substantially an H-shaped shift outline, generally indicated by the reference character 91, in which the upper end of the manually adjustable hand lever 50 is movable to the various positions and the position marked "x" in each of these figures indicates the position to which the lever has been shifted. This position "x" designates the position to which the lever is shifted to effect the corresponding positions of the operating parts in the associated diagrammatic Figs. 6 to 10 inclusive, respectively.

Positioned adjacent the rod end of the cylinder 28 is a down switch 92 which has one terminal connected to the ground wire 73 and the other terminal connected by a wire 93 to a terminal post 94 within the switch box 41. The post 94 is connected to a contact point 95 which, in turn, is located in the path of and is adapted to be engaged in contacting relation by the contact point 77 of the control arm 78. Thus, when the lever 50 is shifted to the position shown in Figs. 8 and 8A of the drawings, for the automatic down circuit, the hand lever 50 pivots about its pivot 48 and the fork 52 moves the shifter rail 42 to the left or down position. The valve lever 45, in turn, is actuated about its pivot 44 moving the valve spool 24' to the right or down position. The flow of fluid under pressure through the conduit 26 to the piston rod end of the cylinder 28 causes the rod 32 to be retracted and thereby carries with it the depth stop collar 33 to the left as indicated in Fig. 8 of the drawings. When the shifter rail 42 is moved to its extreme left position, the plunger 80 drops into the notch 81 in the rail 42. In so doing, the contact arm 78 pivots about the inner end of the plunger 82 and causes the contact points 77 and 95 to close the circuit. The electrical circuit is now complete from the battery 65, arm 63, contact points 61 and 62, wire 60, solenoid 56, wire 88, jumper wire 86 and breaker arm 78, across contacts 77 and 95, through wire 93 to down limit switch 92. When this circuit is closed and the solenoid energized, the magnetic field of the solenoid 56 builds up, causing the plunger 57 to be forced into the notch 59 of the shifter rail 42. (See Fig. 8 of the drawings.) The solenoid plunger 57 will thus hold the rail 42, handle 50 and the valve spool 24' in this position with no necessity of the operator holding the hand lever 50 in this position until either the collar 33 on the rod 32 engages a reciprocating trip member 96 which is operatively connected to down limit switch 92, or the operator moves the hand lever 50 laterally. The latter movement of the lever 50 will actuate the switch lever 53 to open the circuit at points 61 and 62. In the event that either switch 61, 62 or 92 of the circuit is opened, the magnetic field of the solenoid 56 will collapse, causing the poppet 57 to release its holding on the rail 42. When this occurs, the lever centering spring 51 will move the lever 50, the shifter rail 42 and the valve spool 24' to neutral positions.

In the visual up and visual down positions, shown respectively in Figs. 9 and 10 of the drawings, the hand lever 50 is moved laterally to the positions either indicated at "x" in Fig. 9A or 10A respectively. As the lever 50 is moved away from the switch operating lever 53, the spring 55' will actuate the forward end of the lever 53 about its pivot 54, causing the plunger 69 to be actuated inwardly and thereby move the contact point 62 in contacting relation with the contact point 67. This completes the electrical circuit from the battery 65, through contact arm 63, cross contact points 62 and 67, through a cylinder wire 96' and through the electro-magnet 34 to the ground wire 73 which is grounded at the switch box 40. This causes the electro-magnet 34 to become energized, building up a magnetic field which attracts and holds the collar 33 against the head of the cylinder 28. The preselection collar 33 is frictionally and adjustably mounted on the piston rod 32. The position of the collar 33 on the piston rod 32 is adjusted by magnetically holding the collar 33 against the cylinder head 28. The position of the collar 33 on the piston rod 32 is adjusted by magnetically holding the collar 33 against the cylinder head and moving the piston hydraulically by manually moving the hand lever 50 to either the visual up or visual down positions, as indicated respectively in Figs. 9 and 10 and corresponding Figs. 9A and 10A of the drawings.

It will be noted that the contact points 61 and 62 are open during this adjusting procedure, thus the solenoid 56 cannot become energized, thereby preventing the possibility of the shifter rail 42 and valve spool 24' from being held during these operations. For this reason the operator must hold the hand operating lever 50 while observing the visual up or visual down positions in order that the desired preselection adjustment of the collar 33 on the piston rod may be attained. When the desired adjustment has been attained, the operator releases the lever 50. When the hand lever is released, it automatically returns to the central or neutral position, thus opening the electrical as well as the hydraulic circuits and thereby stopping all further movements.

Summarizing the advantages and functions of operation of our improved electrically controlled hydraulically actuated unit, it will readily be understood that by utilizing a single manually operable lever to not only actuate the selector valve member, but to also control a plurality of switches and electrical circuits and lock the valve member to control the preselection adjustment of hydraulic unit, we have reduced to a minimum the number of operating parts in the unit necessary to accomplish the desired functional operation of the device.

One of the novel features of the above described system in the automatic up and automatic down of the hydraulic control unit is the fact that the lateral movement of the hand lever 50, as indicated at "x" in Fig. 9, 7A and 8A of the drawings, in either position will cause the switch lever 53 to pivot about its pivot 54, causing the spring 55' to move the lever 53. This will force the plunger 69 against the contact arm 63, open contact points 61 and 62 and thereby break the circuit of the solenoid 56. The valve spool 24', shifter rail 42 and operating handle 50 will then be returned to neutral position.

In the above specification we have described the complete operational parts for the operation of one hydraulic cylinder unit, but in Figs. 1, 2 and 3 of the drawings, the operating or control parts of a second cylinder unit are disclosed and the corresponding parts are designated by identical reference characters having the letter "a" following the numeral since their construction and functional operations are the same as that for the first cylinder unit.

While in the above specification we have described one embodiment which our invention may assume in practice, it will, of course, be understood that the same is capable of modification and that modification may be made without departing from the spirit and scope of the invention as expressed in the following claims.

What we claim as our invention and desired to secure by Letters Patent is:

1. A stroke control means for a fluid motor comprising a cylinder and a piston having a piston rod, valve means for controlling the fluid flow to and from said cylinder to actuate said piston rod, movable means mounted on said cylinder, means frictionally engaging said piston rod for actuating said movable means, electro-magnetic means carried by said cylinder and engageable with said frictional means for magnetically holding and adjusting said frictional engaging means on said piston in response to a predetermined movement of said piston rod, an electrical circuit connected to a source of electrical energy, said electro-magnetic means connected in said circuit, a normally closed switch in said circuit adapted to be actuated to its opened position by said frictional means, a second normally closed switch in said circuit, a manually movable lever operatively connected to said valve means for manually moving said valve means, said lever being operatively related to said second switch for manually moving said second named switch to open said circuit for de-energizing said electro-magnetic means.

2. A fluid operative device comprising a housing, a valve mechanism mounted in said housing and connected to a source of fluid pressure, a fluid motor including a cylinder, a reciprocating piston and piston rod, conduits connecting the opposite ends of said cylinder with said valve mechanism, a lever mounted on said housing for universal movement thereon, a shifter rail slidably mounted in said housing and operatively connected to said lever for longitudinal movement, a solenoid operated means for locking said rail in various positions, an electrical circuit connected to a source of electrical energy for energizing said solenoid, a normally closed switch in said solenoid circuit carried by said cylinder and adapted to be actuated to its opened position by said piston, and a second switch in said solenoid circuit operatively related to said lever whereupon the lateral movement of said lever is actuated to break said circuit.

References Cited in the file of this patent

UNITED STATES PATENTS

| | | |
|---|---|---|
| 1,955,154 | Temple | Apr. 17, 1934 |
| 2,331,108 | Ganahl | Oct. 5, 1943 |
| 2,554,930 | Ulinski | May 29, 1951 |
| 2,555,046 | Livers | May 29, 1951 |
| 2,707,867 | Ruhl | May 10, 1955 |